US008676685B2

(12) United States Patent
Rowe (10) Patent No.: US 8,676,685 B2
(45) Date of Patent: *Mar. 18, 2014

(54) METHOD AND APPARATUS FOR FACILITATING MONETARY AND REWARD TRANSACTIONS AND ACCOUNTING IN A GAMING ENVIRONMENT

(75) Inventor: Rick Rowe, Las Vegas, NV (US)

(73) Assignee: IGT, Reno, NV (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/356,979

(22) Filed: Jan. 24, 2012

(65) Prior Publication Data

US 2012/0190433 A1 Jul. 26, 2012

Related U.S. Application Data

(63) Continuation of application No. 12/404,899, filed on Mar. 16, 2009, now Pat. No. 8,135,644, which is a continuation of application No. 10/652,155, filed on Aug. 28, 2003, now Pat. No. 7,526,447, which is a continuation of application No. 09/921,716, filed on Aug. 3, 2001, now abandoned, which is a continuation-in-part of application No. 09/497,788, filed on Feb. 3, 2000, now abandoned.

(51) Int. Cl.
*G06Q 40/00* (2012.01)
*G06Q 20/10* (2012.01)

(52) U.S. Cl.
CPC .............. *G06Q 40/00* (2013.01); *G06Q 20/108* (2013.01)

USPC .................................. 705/35; 705/39; 705/42

(58) Field of Classification Search
CPC ............................ G06Q 40/00; G06Q 20/108
USPC .................................... 705/35, 39, 42
See application file for complete search history.

(56) References Cited

U.S. PATENT DOCUMENTS

| 5,811,772 | A | * | 9/1998 | Lucero | 235/380 |
| 5,952,640 | A | * | 9/1999 | Lucero | 235/380 |
| 5,959,277 | A | * | 9/1999 | Lucero | 235/380 |
| 7,107,245 | B1 | * | 9/2006 | Kowalick | 705/44 |

* cited by examiner

*Primary Examiner* — Kirsten Apple
*Assistant Examiner* — Scott S Trotter
(74) *Attorney, Agent, or Firm* — Foley & Lardner LLP (57) ABSTRACT

Financial and player tracking/reward transactions are facilitated by a system including at least one server and a plurality of gaming machines. The server has a memory containing data files corresponding to players that contain information such as credits or monies in an account belonging to the player. The data files also contain player tracking information, such as points awarded to a player based upon their game play. Players are issued media in the form of player cards having identification information thereon that may be used to access the player's account or files. A player and a casino may manage the player's accounts, such as by placing criteria upon the account, including the use of associated credits. A player may play a game using credits associated with their account. A player may also manage their accounts, including viewing financial and game play or reward information and transfer funds into and out of an account.

18 Claims, 3 Drawing Sheets

METHOD AND APPARATUS FOR FACILITATING MONETARY AND REWARD TRANSACTIONS AND ACCOUNTING IN A GAMING ENVIRONMENT

RELATED APPLICATIONS

This application is a continuation of U.S. application Ser. No. 12/404,899, entitled "METHOD AND APPARATUS FOR FACILITATING MONETARY AND REWARD TRANSACTIONS AND ACCOUNTING IN A GAMING ENVIRONMENT" and filed on Mar. 16, 2009, issued as U.S. Pat. No. 8,135,644, which is a continuation of U.S. application Ser. No. 10/652,155, entitled "METHOD AND APPARATUS FOR FACILITATING MONETARY AND REWARD TRANSACTIONS AND ACCOUNTING IN A GAMING ENVIRONMENT" and filed on Aug. 28, 2003, issued as U.S. Pat. No. 7,526,447 which is a continuation of U.S. application Ser. No. 09/921,716 filed Aug. 3, 2001, now abandoned, which is a continuation-in-part of U.S. application Ser. No. 09/497,788 filed Feb. 3, 2000, now abandoned, all of which are hereby incorporated by reference and for all purposes.

FIELD OF THE INVENTION

The present invention relates to methods and devices for permitting monetary and reward transactions, and especially those associated with game play.

BACKGROUND OF THE INVENTION

Traditionally, the play of casino games and other games of chance was based on the wagering of actual money, such as coins and currency. Coins and currency have traditionally been used directly as bets in table games such as poker and blackjack. Alternatively, the coins and currency are exchanged for chips which have a representative monetary value.

As mechanical games of chance were developed, such as the well-known slot machine, coins were used to activate the machines. Later, bill validators were provided which allowed players to avoid the need to convert their currency to coins before playing a gaming machine.

Outside of the gaming industry, the consumers were provided with a large variety of options to effectuate their banking and other monetary transaction needs. For example, the credit card was developed and has become widespread in use.

In some instances, the gaming industry has come to embrace some of this technology and provide greater flexibility to consumers. In general, however, the development of this technology has focused upon interfacing existing external systems, such as banking systems, with internal casino accounting. For example, U.S. Pat. No. 5,457,306 discloses the use of credit cards in association with gaming machines.

The prior art has not addressed, at least from the consumer or player's point of view, providing convenient means for effecting financial transactions in the gaming environment. In addition, players are not provided with a convenient mechanism for tracking their play, including expenditures and winnings. Player tracking or reward systems and the financial aspects of playing games also remain independent.

It is desirable to provide one or more methods and devices which serve to facilitate monetary and commercial transaction in a manner overcoming the above-stated limitations.

SUMMARY OF THE INVENTION

The present invention comprises methods and apparatus for effectuating financial and reward transactions in a casino or gaming environment.

One or more embodiments of the invention comprises a system. In one embodiment, the system includes a network linking a plurality of gaming machines and at least one transaction host or server.

The gaming machines are arranged to accept input of player identification information. In one embodiment, the gaming machine includes a card reader for reading identification information from a magnetic stripe.

The transaction host includes a memory. At least one data file is stored at the memory in association with each player. The at least one data file is accessible with the identification information. The data file includes financial information. Preferably, the financial information comprises credit information. The credit information represents credits or monies which belong to the player and/or may be used to play a gaming machine. In one or more embodiments, the player's file or files represent one or more financial or award accounts.

In one or more embodiments, the data file includes player play or reward information. The reward information may include points which have been awarded to the player.

The system is configured to update credit information corresponding to a player in the player's file based on amounts bet and amounts won. The system is also configured to record or track game play information as a player plays a game.

In one embodiment, the system includes a gateway via which a player may access the transaction host and obtain financial and reward information, and engage in financial and reward transactions. A player may also engage in these activities through a kiosk, customer service station or the like associated directly with the network.

In one embodiment, the system includes a financial host and a reward host, each containing one or more files regarding a player. The financial and reward hosts are linked. Use by a player of their player card permits the player to access both their financial account (such as by betting credits associated with the account) and their reward account (such as by accumulating credits based upon the player's game play).

In accordance with a method, one or more accounts or files are associated with a player. One or more of the files or accounts are financial accounts having associated credit information.

A player may deposit funds which are credited to their file or account. The funds may be deposited electrically, such as by a wire transfer. The funds may also be deposited to a cashier and then credited by the casino. A player may engage in the play of a gaming machine and place bets using credits associated with their file or account. Winnings maybe credited to the player's account.

In one or more embodiments of the invention, a player and/or the casino operator may place criteria or restrictions upon the account. For example, only a certain amount of money or credits may be deducted from the player's account over a predetermined period of time. In one embodiment, a player may have a main account comprising a debit account from which bets are deducted. The player may have a secondary account to which all winnings are credited.

A player may divert all or a portion of their winnings. For example, a portion of each win may be deposited in the player's account and a portion may be diverted to a charity account. The casino may also divert a portion of the player's winnings representing a tax withholding.

A player may access and manipulate their one or more accounts via an on-line communications link. The player may combine, close and open accounts. The player may deposit and deduct funds. The player may purchase reward points and redeem points for prizes or credits which are deposited in the player's funds account.

In accordance with the invention, a player establishes a financial account directly with a casino. The player and casino are permitted to manage the account. The player is also provided with a separate or integrated reward account.

In one embodiment, a system of the invention includes a game server. The game server is adapted to generate game information for transmission to a remote location where a game is presented using the generated information. The game transaction server is also adapted to receive input, such as a player's input regarding the play of a game.

In this embodiment, a player is permitted to play a game from a remote location, such as a remote station, home or office computer. A player's identification information is provided to the system, such as via the gaming gateway. A communication link is provided between the player's remote location and the gateway. This link may comprise the Internet or a dedicated line.

The player's identification information is utilized to verify funds available to the player for establishing entitlement to a play a game, i.e. the placing of a wager or bet. The player's play may be tracked and the player may manipulate their account(s) and having winnings from the play of the remote game credited to their accounts(s).

Further objects, features, and advantages of the present invention over the prior art will become apparent from the detailed description of the drawings which follows, when considered with the attached figures.

DETAILED DESCRIPTION OF THE INVENTION

The invention comprises one or more methods and apparatus for facilitating monetary and commercial transactions. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention In general, the invention comprises one or more methods and apparatus for facilitating transactions, such as monetary finds transfers and purchases, and especially those occurring at least partially electronically. In one embodiment, the invention comprises methods and apparatus for facilitating commercial transactions, such as the purchase of goods and services. In other embodiments, the invention comprises methods and apparatus for facilitating monetary and reward transactions in a gaming environment.

Figure 1:
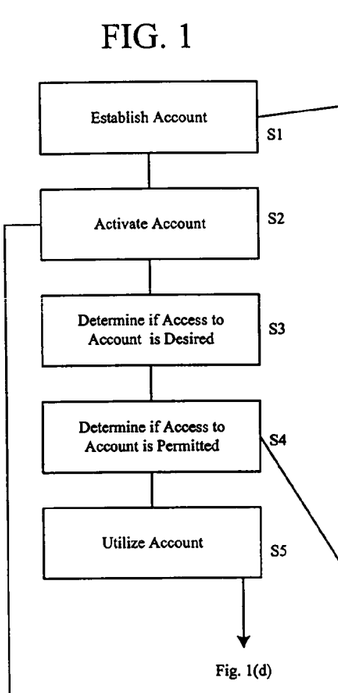
FIG. 1 is a flow diagram illustrating a method in accordance with the present invention.

Referring to FIG. 1, there is a flowchart illustrating generally a method of creating an account and utilizing an account in accordance with the invention. In a first step S1, an account is established. The account is established by an account provider. The account provider may be a retailer, bank or other entity, such as described in more detail below, a casino. As provided below, regardless of whether the account is referred to as a financial, bank, debit, monetary or other named account, the account has certain characteristics that define it. The account may be established at the request of a party for use by themselves or for use by another or others.

Figure 1A:
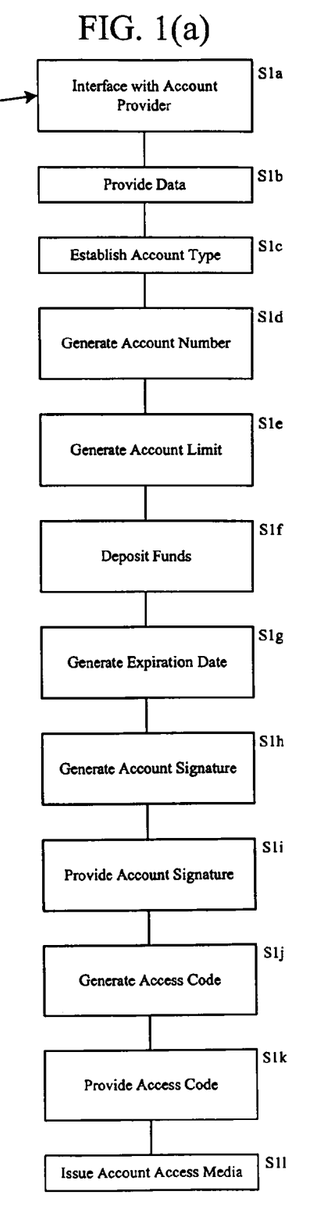
FIG. 1(a) is a flow diagram illustrating in detail a method comprising a step of establishing an account in accordance with the method illustrated in FIG. 1.
Figure 1B:
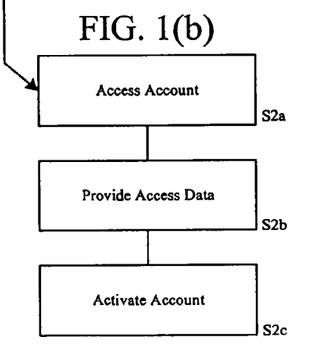
FIG. 1(b) is a flow diagram illustrating in detail a method comprising a step of activating an account in accordance with the method illustrated in FIG. 1.

Referring to FIG. 1(a) there will be described one or more methods for establishing an account. In a first step S1a, a customer interfaces with an account provider. This step may comprise the customer accessing a website belonging to the account provider, calling an account provider customer representative, or accessing one or more other means now known or later developed by which the customer may provide information to the account provider. Also, the customer may travel to the location of the account provider or to a designated location provided by the account provider (such as a kiosk).

In a step S1b, the customer provides data to the account provider. This data is used to set up the account. The particular data which is required may vary by provider. In one or more embodiments, the data may include the customer's name and/or the name(s) of the parties which are to be permitted to access the account, address, telephone number, social security number, birth date, mother's maiden name and/or other information. In the event the customer is a business, the information may comprise the business name, address, telephone number, taxpayer identification number and/or similar information.

The particular manner by which this information is transmitted to the account provider may depend upon the interface the customer is using. For example, the data may be input into a graphical user interface associated with the account provider's website and then sent to the account provider's computer, such as over the Internet. The data may be provided orally over the phone by the customer to the account provider. The customer may also fill out a printed form and transmit the form, such as by mail or facsimile.

In a step S1c, an account type is established. In one or more embodiments, the account type may comprise one or more of the following: general customer, charity debit, promotional, or allowance account. The account may be utilized for a wide variety of purposes and need not be limited to those described below.

A general customer account is preferably of the type where funds belonging to the customer are assigned or credited to the account, and payments, outgoing transfers and the like are associated with direct debits of these funds from the customer's account. As described below, the customer account preferably permits deposits thereto as well. In one embodiment, the nature of the account as a debit account differs from a credit type account where those funds which are debited belong to the account provider or other creditor with the requirement that the customer repay the account provider with their funds at a date after a particular transaction. In general, the general customer account permits a customer to make and pay for purchases, obtain funds (such as currency), and transfer funds into and out of the account. As described in more detail below, in one embodiment, such transactions may comprise the debiting of funds from the account as payment for a wager or bet when playing a game, and may include the deposit of winnings.

A charity debit account is preferably of the type where the customer may only transfer funds from the account to an authorized charity or similar entity, with no other debits permitted (except return of the funds to the customer or transfer of funds to another account belonging to another account at the specific instruction of the customer). Generally, the customer will provide the account provider specific information about the charity to which funds are to be transferred. The customer may arrange the account such that funds are debited and transferred to the charity at one or more predetermined times and for one or more predetermined amounts.

A promotional account is preferably of the type where the customer is a promoter arranging an account for use by one or more other parties. For example, the promoter may be a store owner and the parties who may use the account may comprise customers or potential customers of the store. The promotional account is arranged so that the parties or users may access the account in accordance with the terms of a promotion offered by the promoter. A promoter may establish an account having funds permitting a number of parties to pay for a certain dollar amount of goods purchased at their store via the promotional account. For example, a promoter may establish a promotion for a number of parties, such as 1000 existing customers, whereby $10 of each purchase from the promoter over $20 is payed for by the promoter. The $10 payment may be debited from the promotional account at the time each party makes a qualifying purchase to credit the parties' payment of the goods or services. In one embodiment, the promotional account may comprise an account entitling a party to play a predetermined amount of money at games at a casino, or to obtain other goods or services from the casino operator.

An allowance account is preferably of the type where funds are arranged to be periodically transferred into the account. Such an account may be extremely useful to parents having children. In accordance with this account arrangement, funds are periodically transferred into the account for subsequent use. The funds may be transferred from another established account, or an account or other source not associated with the account provider. For example, parents may establish a customer account from which funds are periodically transferred, such as every two weeks, into an allowance account which is accessible by one or more of their children. These children may access the allowance account to pay for books and the like. In this manner, the parents may control (and as described below, track) the spending, of their children or other parties which have access to the account.

An allowance account may also be used to pay bills and pay for entertainment or be for other purposes. Monies maybe deposited in the account periodically for paying particular bills, especially those which are payable on a predetermined regular basis. The allowance account may be used to define an amount of money for a particular discretionary purpose. For example, a family may deposit monies into an allowance account which may be used in that or successive months for entertainment purposes, such as gaming, travel, movies, or the like.

Those of skill in the art will appreciate that the particular type(s) of accounts and their various features or characteristics may be different than those provided above. For example, an account may have one or more features associated with more than one of the account types provided above.

In a step S1d, the account provider generates an account number and associates the account number with the account. The account number may be used by the account provider and customer to identify the account.

In a step S1e, in one embodiment of the invention, the account provider assigns the account with a maximum funds value or value limit. In general, this value may be selected by the customer. Most often, the maximum value will comprise the amount of an initial deposit into the account by the customer. In one or more embodiments, the account provider may only offer accounts having pre-set limits, such as $50, $100, $250 or $500. In another embodiment of invention, the account has no limit.

In a step S1f funds are deposited into the account. In an embodiment where the account has a minimum limit, the maximum amount of funds which may be deposited into the account does not exceed the funds maximum value associated with the account.

In one or more embodiments, the customer may provide data which permits the account provider to obtain funds electronically. In one or more embodiments, this comprises providing the account provider with a routing number for a checking or savings account at a bank, account and access information for an ATM card linked to an account, or a credit card. In one or more embodiments, a customer may be permitted to deposit funds by mail or similar non or partially non-electronic manner. A customer may also be permitted to deposit monies in person, such as at a cashier cage at a casino or a bank teller.

In a step S1g, the established account may be assigned an expiration date. In one or more embodiments of the invention, this step comprises associating date data with the account. The expiration date may be generated in a wide variety of manners. The expiration date may comprise a date which is determined by adding a fixed period of time to the date on which the account is established or, as described below, the date on which the account is activated. As described below, the account is arranged such that when the actual date reaches the expiration date, the account can not be accessed except by the account provider.

In a step S1h, an account signature is generated and associated with the account. The signature comprises a unique code or other element for identifying the account and/or establishing entitlement to access the account. In one or more embodiments, the account provider generates the code based on one or more elements of data associated with the account, such as customer provided data, the initial funds deposit amount, the account number, the account expiration date and/or one or more other elements. In one or more embodiments, the account signature is generated from, or includes, an access code or personal identification number (PIN) data assigned to or selected by the customer as described below. In one or more embodiments, the data used to generate the signature may be input into an encryptor to generate an output which comprises the account signature. The account signature may be generated randomly as well. Preferably, whatever means is used to generate the signature, each signature is unique for a particular account.

In a step S1i, the account signature or identification information is provided to the customer. In one or more embodiments, the account signature is mailed to the customer, told over the phone by a customer representative of the account provider to the customer, or is transmitted electronically to the customer. As described below, in the event the customer is provided with an account access media, then the account signature may be provided on the account media. The account signature may be printed on, embossed in, or encoded on the account media or an element associated therewith.

In a step S1j, an account access code is generated and associated with the account. In one or more embodiments, the account provider generates the access code. In other embodiments, the customer generates the code and provides it to the account provider. The access code may comprise a personal identification number or "PIN" comprising one or more letters and/or numbers.

In a step S1k, the access code is provided to the customer. In the case where the customer selects the access code, this step is completed at the same time as step S1h. When the account provider generates the code, the code may be mailed, electronically transmitted or spoken to the customer.

In a step S1l, in one or more embodiments, the customer is provided with an account access media. The access media may comprise a card, check, ticket, chip or a wide variety of other items. In one or more embodiments, the account signature is associated with the access media. When the access media comprises a card, check or the like, the account signature and/or account may be printed or encoded thereon. The account signature may be provided in one or two-dimensional bar code form or be encoded in a magnetic stripe or a chip or other data storage element associated with the media.

The account signature and/or access code may comprise a physical characteristic of the customer. For example, the access code may comprise a fingerprint or the customer's retinal features. In general, the account number, signature and access code are for use in identifying the particular account and ensuring that only those parties with authority to access an account can do so. A variety of other methods and devices may be used for these purposes.

In one or more embodiments, the method need not include all of the above-referenced steps. A variety of other steps and may be associated with the establishment of an account for the customer, and the steps described above need not be completed in the order in which they were described.

In the above-described embodiment, an account number, account signature and access code (i.e. PIN) are used to identify and gain access. For example, in one arrangement, only an account identifier, such as an account number, is assigned and used to gain access to an account. In another embodiment, a PIN is also utilized. In one embodiment, an account number may be used to gain access to an account via a customer service representative. A more complex account signature may be associated with an access media for gaining access to the account, as the user need not remember the complex account signature if it is stored and readable.

Referring again to FIG. 1, in a step S2, an account which the customer wishes to access is activated. Normally, this step will be in response to a customer wishing to access a newly established account.

Referring to FIG. 1(a), there is illustrated one embodiment of a method of activating an account in the event the account has not been activated. In a first step S2a, the customer accesses the account. In one or more embodiments, this step comprises a customer contacting the account provider, such as via a website of the account provider or by telephone with a customer service representative.

In a second step S2b, the customer provides their account number, signature and, in one or more embodiments, the access code. This account identification and access data may be provided by a customer telling an account representative the information, typing the information into a data input accepting element of a graphical user interface of a website, or otherwise transmitting such to the account provider. In one embodiment, the account number and signature may be scanned off of an account media provided the customer, such as with a magnetic stripe or bar code reader.

In a step S2c, the account provider activates the account. In one or more embodiments, this step comprises associating data with the account which indicates that the customer and/or other designated and/or appropriate parties may utilize and access the account.

The account activation may be accomplished in a wide variety of other manners. For example, in one embodiment, a customer may activate an account by simply calling a phone number of the account provider or entering the appropriate data into the account provider's website. In this arrangement, it is not necessary for the customer to access the account or provide all of the account information which may be necessary for the customer to use the account.

In one embodiment, an account may be activated for use by a customer at the time it is established. When the account is created, it may automatically be activated by the account provider.

In such an arrangement, any access media associated therewith maybe separately activated. For example, the account may be activated when established, allowing a customer to make deposits, funds transfers or the like through an account provider representative or website. However, the customer may not be permitted to utilize an account media (such as for purchases or cash withdraws) until the customer activates the account as to the media. The customer may activate an access card by calling a representative of the account provider after the card is received or other means.

Referring again to FIG. 1, in a step S3 it is determined if a customer wishes to access an account, as by a customer's attempted use of the account. This step may be remote in time from step S2, or at the same time. For example, a customer may activate an account shortly after establishing it, but not access the account for several days or weeks thereafter. A customer may also wish to activate an account and utilize it at the same time, such as when the customer wishes to pay for a purchase at a store.

In one or more embodiments, this step comprises determining if a customer is accessing a bank, automated teller, customer service representative, account provider website, remote payment station, gaming machine or the like. In order to determine if the customer is attempting to access an account, particular account information and associated access data is required. This data may be provided to the account provider or other account access controlling entity in a number of manners. In one or more embodiments, the account information may be directly provided by the customer, as through data input into a website or spoken to an account representative, or by reading the information from the access media.

The customer may wish to access the account for a number of reasons. For example, in the event a customer wishes to complete a purchase from a vendor, such as on-line or at a store, the customer may seek to access the account to pay for the purchase. The customer may seek access to the account to obtain funds from an automated teller machine.

In one or more embodiments, data must be provided to the account provider to establish the entitlement of the customer to access the designated account. This information may comprise the account signature and/or access code. Again, the particular means and/or method by which this information is provided may vary. In an embodiment where a customer is seeking to access an account using an access media, the account signature may be read or scanned from the card, and the access code may be provided by the customer, such as through a keypad. The customer may also provide such information through a variety of data input devices, such as a computer or customer station at a store, or provide the information directly to an account representative.

When a customer wishes to access an account, in a step S4 it is determined if the access to the account is permitted. In one or more embodiments, and referring to FIG. 1(c), this step includes a step S4a of determining if the provided account access information is correct and complete. In one or more embodiments, this step comprises comparing the provided account identification and/or access information to that associated with the account which the customer is seeking to access. If the required information has not been provided or is not correct, access to the account is denied. The customer may then be directed to contact the account provider and/or attempt to re-enter the required data in case there was an error in providing or transmitting it to the provider.

Figure 1C:
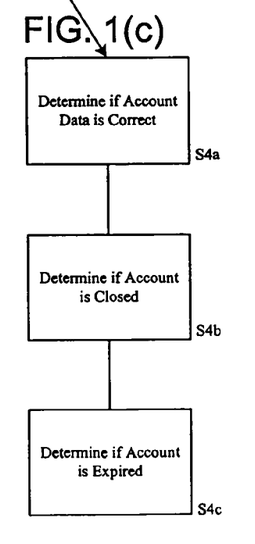
FIG. 1(c) is a flow diagram illustrating in detail a method comprising a step of determining if access to an account is permitted in accordance with the method illustrated in FIG. 1.

If the requisite access information is provided, then in a step S4b, it is determined if the account is closed. If the account has been closed, then access to the account is denied. The account may be closed at the request of the customer, upon violation of account terms and conditions or for a wide variety of other criteria or reasons.

If the account is not closed, then in a step S4c, it is determined if the account is expired. The account may be determined to be expired if a current date is the same as or timewise later than the expiration date assigned to the account. If the account is expired, the customer is not permitted to access the account directly. Preferably, in that situation, the customer may access the account only through the account provider. The customer may contact the account provider and arrange for the removal of any funds remaining in the account. Alternatively, the customer may be permitted to re-activate the account with a new expiration date.

If in step S4 it is determined that access is permitted to the account, then in step S5, the customer is permitted to utilize the account. As described below, a variety of transactions, interactions with and manipulations to the account are permitted.

Figure 1D:
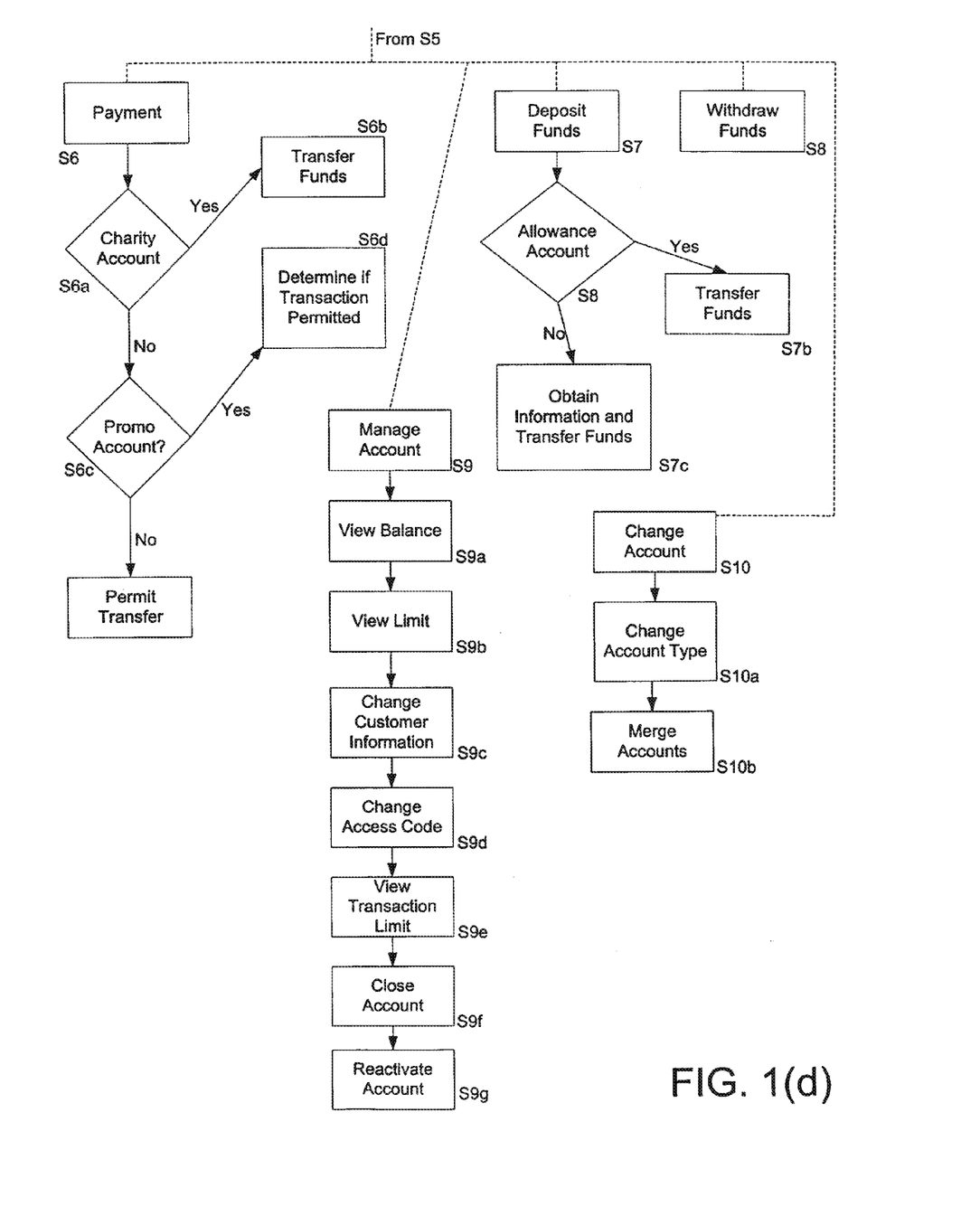
FIG. 1(d) illustrates various flow diagrams of methods comprising a variety of methods of utilizing an accordance in accordance with the method illustrated in FIG. 1.

Referring to FIG. 1(d), in one or more embodiments, in a step S6, a customer is permitted to utilize the account to make a payment to a third party. A variety of methods may be implemented to effectuate this step. In one or more embodiments, in a step S6a, it is determined if the account is a charity account. If so, in a step S6b, funds are transferred from the charity account to a selected charity.

In one or more embodiments, when a charity account is established, the account provider designates the account a charity account. At that time, a customer may designate one or more charities to which funds placed in the account are to be distributed to. These funds may be distributed in accordance with the specific instruction of the customer at a later date, or at a predetermined time or in accordance with a predetermine schedule. The amount of the finds to be distributed may be designated by the customer as well. In one or more other embodiments, the customer may designate the charity(ies) to which funds are to be distributed after the account has been established.

In one or more embodiments, the funds which are distributed to the charity are transferred electronically from the account by the account provider to an account belonging to the charity or an intermediate escrow account or the like from which the charity may obtain payment. In other embodiments, the finds may be mailed or transmitted in other manners.

If the account is not a charity account, then it is determined in a step S6c if the account is a promotional account. If the account is a promotional account, then in a step S6c, the account may be used to purchase or pay for goods from specific parties. Preferably, the account provider must verify that the purchase is being made from one of the authorized parties. Normally, when the purchase is being made, the vendor will transmit vendor identification information along with the customer's account information. The account provider can verify the vendor from the provided vendor information.

If in step S6c it is determined that the account is not a promotional account, then it is determined that the account is a customer or allowance account which may be used as the source of payment for a transaction with, in general, any party. In step S6e, the purchase or other transaction is then facilitated by debiting the account.

It will be appreciated that a variety of steps other than those described may be associated with the payment of a purchase from the account. For example, in one step, the account provider must generally verify that sufficient funds exist in the account to permit the transaction. If sufficient funds do not exist, then the transaction may not be permitted. Alternatively, as described below, the account may be provided with a "credit" or "overdraft" feature which would still permit the customer to access the account.

As part of the transaction, the particular vendor may send information which facilitates the transfer of funds from the customer's account to the vendor's account by the account provider. For example, this information may comprise a vendor identification or account number.

As provided above, the method and apparatus by which the customer accesses the account to facilitate a purchase may vary. For example, if the customer is purchasing goods at a store, the customer may swipe their access media through a card reader and enter their access code. If the purchase is through a web-site or similar on-line access, the data may be input into a graphical user interface of the site. In one embodiment described in greater detail below, the apparatus may include a system for use in a casino or other gaming environment.

In accordance with one or more embodiments of the invention, the payment for purchase may be arranged as an automated debit from the account. For example, a customer may arrange for payments to be made from the account on a periodic basis, such as in response to monthly amounts due a party (such as for a car payment or the like). In such event, the customer may provide the necessary debit information to the account provider.

In one or more embodiments, a purchase may be made in the form of an automatic funds transfer. For example, a customer may arrange with a particular vendor an arrangement where payment for the goods or services is made automatically. The customer provides the vendor with the account data which is then used by the vendor at one or more times subsequent thereto to affect payment. As an example, a customer may provide account data to their electric company. The electric company may then receive payment for the electricity supplied to the customer each month directly from the account through the account provider without intervention by or acts required by the customer. In this embodiment, the step of the customer accessing the account, step S3, generally comprises the customer providing the account data to the vendor or other party and then the vendor accessing the account as agent of the customer.

As one aspect of utilizing the account, as illustrated in FIG. 1(d), in a step S7, in one or more embodiments a customer may deposit funds into the account. A variety of methods may be implemented to effectuate this step. In one or more embodiments, this step includes a step S7a of determining if the account is an allowance type account. If so, then in a step S7b, funds are periodically transferred into the account. If the account is an allowance account, a customer will have provided the account provider with a source of funds from which a transfer into the account is to be made. The source of funds may be a customer's credit card, a bank account, or another account in accordance with the present invention. The customer will also have provided the account provider with specific instructions as to when funds are to be deposited, in what amount and the like.

If the account is not an allowance type account, then in a step S7c, the customer must specifically arrange for the particular transfer of funds with the account provider. For example, the customer may access a web-site or customer representative and provide source funds data. This data may comprise credit card information, bank account and routing information or the like. The customer may also arrange for funds transfer between accounts at a bank or similar provided customer station, phone controlled system or the like.

As one aspect of utilizing the account, as illustrated in FIG. 1(d), in a step S8, in one or more embodiments a customer may withdraw funds from the account. A variety of methods may be implemented to effectuate this step. In one or more embodiments, the funds withdrawal may comprise the issuance of currency such as U.S. or other dollars, or other media. In one or more other embodiments, the withdrawal may comprise the transfer of funds to another entity or account.

In general, when the customer desires to obtain currency, the customer travels to an automated teller machine (ATM), bank or similar currency dispensing location. In such event, the step of providing the requisite account data (see step S3) may comprise swiping an account media and inputting an access code. In the event the customer does not have an access media, the customer may provide the requisite data directly to a teller or other bank personnel for input into a system.

If the customer desires to withdraw funds and have the funds transferred into another account, the customer may be permitted to do such over the phone, via the account provider's web site, or at a bank or other location. In this regard, the number of locations at which a customer may effectuate the transfer is not constrained to locations where currency can be dispensed.

If the customer requests funds, and if such funds exist in the account, the customer is provided with funds. This step may include the step of transmitting the funds request to the account provider and the account provider comparing the amount of funds requested versus the total amount of funds in the account. If the funds exist, then the account provider may send a signal or other indication that it is permissible to dispense the funds.

In one or more embodiments, the customer is permitted to request currency or a transfer. If currency is requested, then currency is dispensed. If a transfer is requested, then the funds may be transmitted electronically to a new account. In the event the funds are to be transferred to another account, the customer provides the necessary information, such as the receiving account number and/or routing number and/or receiving party information.

As one aspect of utilizing the account, as illustrated in FIG. 1(d), in a step S9, in one or more embodiments a customer may obtain account information and manage their account. A variety of methods and devices may be utilized to effectuate this step. For example, a customer may call an automated telephonic information system, call a customer service representative or access a web site belonging to the account provider. In one or more embodiments, certain information and transactions may be permitted through an automated teller machine or similar remote access site.

In one embodiment, this step may include one or more of the following steps. In a step S9a, a customer may be permitted to obtain their account balance. The account balance may be provided on a viewing screen or printed on paper.

In one or more embodiments, in a step S9b, a customer may obtain the account limit for their account. The limit value may be displayed to the customer if the customer is located at a display, or may be printed onto a media, such as paper, and dispensed or mailed to the customer. If the customer is utilizing a phone system, the information may be transmitted over the phone.

In one or more embodiments, in a step S9c, a customer may change information associated with their account. This information may comprise their name, address, telephone number, the name(s) of parties permitted to access the account and the like.

In a step S9d, a customer may change their access code or similar access information. For example, in one embodiment, the account provider may assign the customer the access code when the account is established. In accordance with this step, the customer may change this access code to a code of their selection.

In a step S9e, a customer may obtain information regarding transactions associated with the account. This information may include information regarding fund deposits, withdraws and other transactions. In one or more embodiments, the customer may obtain information regarding an amount paid or transferred out of the account, the date of the transfer and the party to whom the amount was paid or transferred. The customer may obtain information regarding an amount deposited or transferred into the account, the date of the transfer and the origin of the funds.

In a step S9f, a customer may close the account. When closing the account, the customer may indicate to the account provider the location to which any funds remaining in the account are to be transferred.

In a step S9g, a customer may re-activate an account in order to change its expiration date. For example, before an account expires, a customer wishing to utilize the account for a longer period of time may elect to re-set the expiration date for the account. In one or more embodiments, the date is automatically set by the account provider, such as by adding a period of time to the current expiration date or the current date. In one or more other embodiments, the customer may select a new expiration date in the future.

As one aspect of utilizing the account, as illustrated in FIG. 1(c), in a step S10, in one or more embodiments a customer may change the status of the account. A variety of methods may be implemented to effectuate this step. In a step S10a, a customer may change the account type, such as from a customer account to a charity or other account, or vice versa. In a step S10b, a customer may merge one account with another account. For example, a customer having two accounts may wish to merge the accounts into a single account. A customer having one account may establish another and then merge or eliminate the first account in favor of the second.

Several examples of account merging are provided below:
1 John Doe's Debit Accounts Account Type Balance Status $250 Debit Account $100 Remaining Active until Jan. 1, 2001 $150 Debit Account $50 Remaining Active until Apr. 1, 2001

After merging accounts into a new account:
2 John Doe's Debit Accounts Account Type Balance Status $250 Debit Account $0 Remaining Closed $150 Debit Account $0 Remaining Closed $150 Debit Account $150 Remaining Active until Jun. 1, 2001

Alternatively, the owner of the accounts may wish to transfer the $100.00 remaining from the $250 account into the $150 account with $50.00 remaining. This would close the $250 debit account and establish a new balance of $150 in the $150 debit account. An example of this transaction is as follows:
3 John Doe's Debit Accounts Account Type Balance Status $250 Debit Account $100 Remaining Active until Jan. 1, 2001 $150 Debit Account $50 Remaining Active until Apr. 1, 2001

After transferring the remaining amount into the $150 account:
4 John Doe's Debit Accounts Account Type Balance Status $250 Debit Account $0 Remaining Closed $150 Debit Account $150 Remaining Active until Apr. 1, 2001

A customer may also be permitted to close the account. If the account is empty, the account is simply closed by the account provider so that further access to the account by the customer is prevented. In the event funds exist in the account, the customer may be provided with the option of transferring the funds to another location or account, or obtain the funds from the account provider by mail.

In accordance with one or more embodiments of the invention, the account provider may provide a credit line or "overdraft" protection for the account. This option may be provided to the customer for free or upon payment of specific service charges. In accordance with this embodiment, in the event a customer wishes to withdraw funds from the account (whether to obtain currency, transfer to another account or payment for goods/services) in an amount greater than that which exists in the account, the account provider may supply the funds to the customer.

In one or more embodiments, the account provider may charge the customer a specific fee for utilizing the credit line, such as a per usage fee, interest or the like. In one or more embodiments, after a particular transaction which exceeds the amount of funds in the account, the account is frozen until sufficient funds are placed in the account or provided to the account provider to cover the funds deficiency.

One or more embodiments of the invention comprise apparatus for use in performing the above-described methods. As stated above, this apparatus may include an access media, such as a card, check, chip or the like. The apparatus may also include a wide variety of devices for interacting with the account provider and/or account. These devices may include some existing devices, such as existing bank teller machines, card reading devices, and data receiving and transmitting devices.

In one embodiment, the apparatus includes a computing device. The computing device includes a memory for storing data. Preferably, the data comprises files of information representing accounts and account information. Means are provided for effectuating the methods of debiting, crediting and manipulating/managing the accounts. In one embodiment this means comprises software, such as machine-readable program code, for effectuating these tasks.

In one embodiment, the computing device may be associated with a network or system. The network may include the Internet, a LAN, WAN, or devices connected by dedicated line or other means of communication.

In one or more embodiments, a customer is permitted to establish and interact with their account via a website or similar on-line access. The website may include a graphical user interface designed to provide information to the customer and prompt and accept that information. The website may have multiple levels or pages. For example, the website may have a home page or "log-in" page which prompts a customer to either identify that they are a new customer and wish to establish or activate an account or identify themselves as an existing customer and have them provide the requisite account information.

If the customer is a new customer, the customer may be sent to a webpage at which information is provided to the customer about the various accounts which may be established. This or other pages may include prompts for providing the data necessary to establish an account.

If the customer is an existing customer and provides the necessary information to access the account (as in Step S3-S5 set forth above), then the customer may be presented with a menu page. At this page the customer may be selected with a menu of items from which to select. These items may be similar to those of steps S7-10. For example, a customer may be provided with a "manage account" item. Upon selecting this item, the customer may be presented with a number of sub-menu items. These items may comprise those items identified in steps S9a-f.

In one or more embodiments, a webpage may display account information for more than one account belonging to a customer. A variety of means may then be presented to the customer for use in manipulating these accounts. For example, a customer may then be permitted to "drop and drag" funds or the like from one account to another.

As indicated, the account provider may have one or more devices adapted to store account information and receive and transmit account data, data representing funds transfers and the like. The data storage device may comprise one or more hard drives or similar elements used to store account data. Modems, servers or similar devices may be used to transmit and receive data.

The devices used to implement the present invention may be incorporated into existing systems facilitating monetary and commercial transactions. For example, the access media associated with an account in accordance with the present invention may be utilized with current card-reading devices.

In accordance with one or more embodiments of the invention, an account provider may issue accounts associated with access media which are available for purchase by customers. For example, an account provider may associate an account with an access media. The access media may have associated therewith an expiration date, account data and a maximum value. A customer may "purchase" the account and associated access media at a retail location. When the account provider is a bank, the bank may place access media on sale at retail locations such as grocery and retail stores.

A customer purchases the account and card by paying the retailer (who in turn pays the account provider). In one or more embodiments, the customer may thereafter access the account by activating the account. This may comprise calling the account provider after purchase. At that time, the account provider may provide the customer with an access code for use in using the access card. The access code could be provided on the card, but this arrangement has added security in that the account provider can ensure that the account is only accessed once it has been paid for.

In this embodiment, a customer may conveniently obtain a "pre-paid" account for themselves or for another party. The account may be used in similar fashion to a credit or ATM card, permitting purchases from any vendor and permitting access to cash from any of a variety of cash-dispensing locations.

It will be noted that in this embodiment, the step of establishing the account is generally accomplished by the account provider without input from the customer. In one or more embodiments, after purchasing or obtaining the access card, a customer may be required or permitted to provide additional information in order to access the account.

As indicated, in one embodiment of the invention, the access card or media may indicate an expiration date thereof and/or the associated account. If the access media and/or associated account is expired, the purchase is not permitted. If the access media is about to expire, the customer may purchase it and, if the customer wishes to extend the expiration date, contact the account provider after purchase to do so. In one or more embodiments, the expiration data may not be printed on the access media, but when it is purchased scanned, read or the like by the vendor to ensure that it is still valid. When a purchase of an access media is made, the expiration data may then be reset a predetermine time from the purchase, with this information scanned onto the card or otherwise associated with the account.

In the above-described arrangement, each access media, once paid for, generally has the same characteristics as cash. A customer may pay for goods using the purchased access media. A customer may deposit the funds associated with the access media into another account, or transfer it to another party.

One or more embodiments of the invention comprise a method and apparatus for permitting financial, reward and other transactions in casino or gaming environment. One or more embodiments of the invention comprise specific or related implementations of the methods described above and illustrated in FIGS. 1-1(*d*).

Applications of these methods and other methods of the invention are described below. In one embodiment, the methods may be implemented via a casino player financial and award transaction system 100 as illustrated in FIG. 2.

Figure 2:
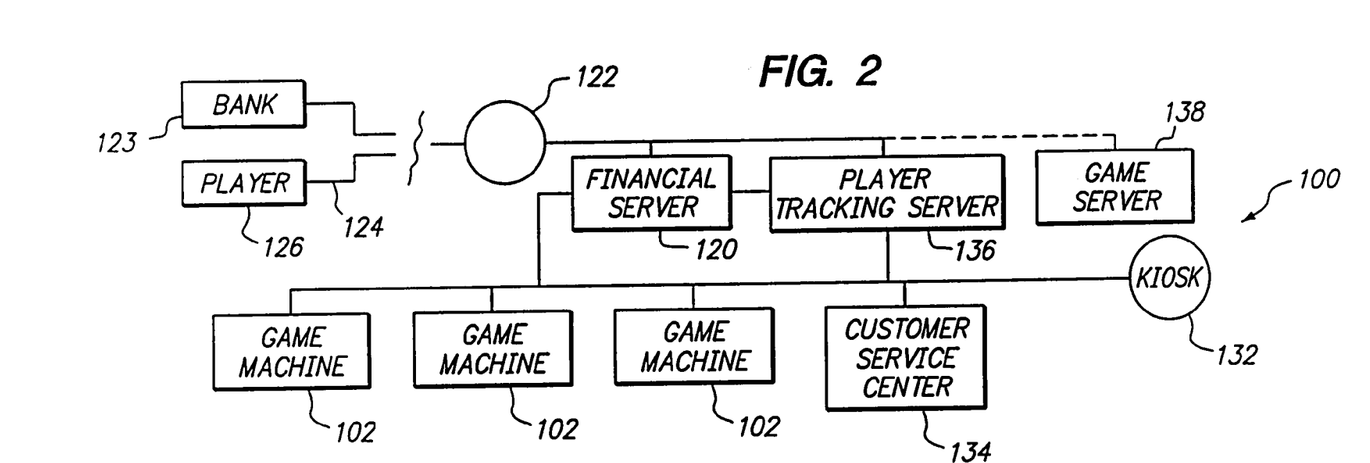
FIG. 2 illustrates a gaming casino player financial and award transaction system in accordance with an embodiment of the invention.
Figure 3:
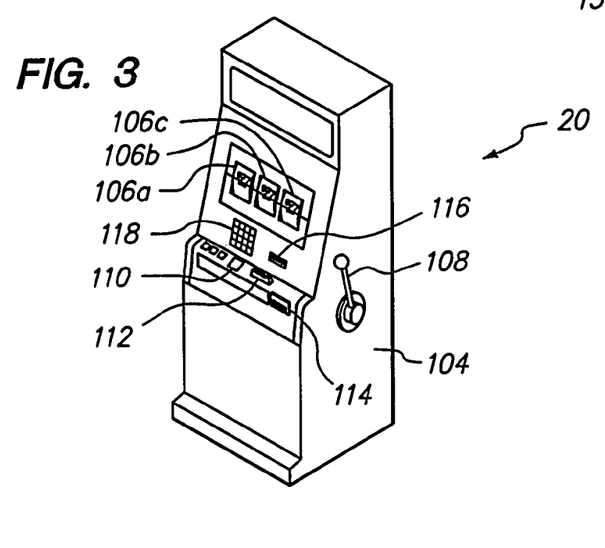
FIG. 3 illustrates a gaming machine which may be utilized in the system illustrated in FIG. 2.

Referring to FIG. 2, in a preferred embodiment, the system 100 includes one or more gaming machines 102 or other gaming devices. FIG. 3 illustrates in greater detail one embodiment of such a gaming machine or device 102. In general, the gaming machine 102 is adapted to present at least one game for play to a player. As illustrated, the gaming machine 102 includes a housing 104 which supports and/or houses the various components of the gaming machine 102. In the embodiment illustrated, the gaming machine 102 is adapted to present a game of "slots," and includes three rotating reels 106*a,b,c*. A handle 108 or spin button 110 may be used to effectuate rotation of the reels 106*a,b,c*.

In this well known game, a player may be declared a winner of the game and awarded an award if the result of the rotation of the reels 106*a,b,c* is a predetermined combination of symbols. It should be understood that the gaming machine 102 may be adapted to present one or more of a wide variety of games. Depending upon the game presented, the configuration of the machine may vary. For example, in the event the gaming machine 102 is adapted to present the game of video poker, then the gaming machine 102 may include a video display.

In one or more embodiments of the invention, the gaming machine 102 is adapted to present a wager-type game. In this arrangement, a player is required to place a bet or wager in order to participate in the game. In the event the outcome of the game is a winning outcome, then the player may be provided with an award such as coins or currency, or credits which may be redeemed for prizes or money. In one arrangement, the award may be winnings in proportion to the amount wagered or bet by the player.

In order to accept a wager, the gaming machine 20 may include a coin acceptor 112 for accepting coins. The gaming machine 20 may also include a bill acceptor or validator 114 for accepting paper currency. In a preferred embodiment, the gaming machine 102 is also provided with means for accepting input regarding an account, such as a card reader 116 for reading an access media in the form of a card including a magnetic stripe. If the access media has another form, then the input device may be suitably arranged, such as a bar code reader for reading a printed bar code.

In one embodiment, the card reader 116 is associated with a player tracking system. In another embodiment, the card reader 116 may be separate from a card reader or other device associated with the player tracking system.

In a preferred embodiment, the gaming machine 102 is associated with a player tracking system. Such a system may also be referred to as a player reward or player loyalty system. The details of this system are described in more detail below. In general the player tracking system includes a gaming machine player tracking device associated with a player tracking host system via a network including a communication link.

The player tracking device of the gaming machine 20 also includes a card reader. As indicated, in one embodiment the card reader of the player tracking device is the same as the access media card reader 116.

In one embodiment, the gaming machine 102 includes one or more additional input devices. The gaming machine 102 preferably includes a keyboard or keypad 118 which permits input from a player. The keypad 118 permits input of an account access personal identification number (PIN).

The gaming machine player tracking device may have a variety of other configurations and include the other devices.

Referring again to FIG. 2, in one embodiment the system 100 includes a plurality of gaming machines 102. Preferably, each gaming machine 102 is associated with one or more other devices through a wired or wireless communication network including at least one communication link.

In one embodiment, each gaming machine 102 is in communication at one or more times with a financial transaction host 120. The financial transaction host 120 may comprise a single computer or a group of computers associated with one another on the network. Appropriate hardware and/or software is provided for permitting the one or more computing devices of the financial transaction host 120 to send and receive information. For example, in one embodiment, data may be sent to and from the financial transaction host 120 in accordance with any number of protocols, such as TCP/IP, Ethernet, IEEE-1394, Bluetooth and others. Appropriate hardware and software is provided for implementing these protocols. Of course, the communication protocol and the form of the network are chosen in tandem. For example, the Bluetooth protocol may be implemented with a wireless network including wireless data relay stations. An IEEE-1394 protocol may be implemented over a wired network, such as copper wire or fiber optic lines.

In one embodiment, the financial transaction host 120 includes at least one data storage element for storing the account information. The data storage element may comprise a hard drive, RAM, tape drive, CD-ROM, DVD-RAM or other memory or data storage member or element. The financial transaction host 120 may including a number of other devices, such as one or more displays, keyboards and other devices for displaying data, controlling operation thereof and the like.

In one embodiment, the financial transaction host 120 includes hardware and/or software for creating financial accounts such as described above, and for implementing account transactions, as also described herein. In one embodiment, the financial transaction host 120 is associated with one or more additional networks besides that including the gaming machines 102.

In one embodiment, the financial transaction host 120 is associated with the Internet and one or more closed or partially closed networks, such as financial/banking networks. In one embodiment, the financial transaction host 120 includes a communications gateway 122. The gateway 122 is preferably adapted to permit communications between the financial transaction host 120 and other devices where the communications protocol may be different. For example, the casino player financial and award transaction system 100 may employ a IEEE-1394 communication protocol. On the other hand, the host 120 be adapted to receive information from and transmit information to the Internet, which utilizes a TCP/IP protocol.

In one embodiment, communications pathways may be provided between the financial transaction host 120 and a variety of devices in a variety of manners. For example, communications may be permitted via phone line or dedicated line. A player or customer may access the financial tracking host 120 via the Internet 124 from a remote location 126. A player may also access the financial transaction host 120 via a direct line, such as a direct-dial phone line connection. Connections with other financial institutions 128 may be by dedicate or secure lines 130.

In one embodiment, the system 100 includes one or more kiosks 132. Such a kiosk 132 may comprise an apparatus at which a player may gain access to the financial transaction host 120. The kiosk 132 may have a variety of forms. In one embodiment, the kiosk 132 may comprise a computing device including a processor, display, and at least one communication interface with the system 100.

In one embodiment, one or more customer service centers 134, such as cashier booths, mobile stations or the like may be associated with the system 100. Preferably, a player may engage in one or more transactions at such a center 134, such as depositing funds into their account.

In one or more embodiments, the system 100 includes a player tracking or reward system host 136. The player tracking or reward system host 136 is in communication with the player tracking device of each gaming machine 102 via the at least one communication link of the system.

In like fashion to the financial transaction host 120, the player tracking host 136 may comprise a single computer or a group of computers associated with one another. Appropriate hardware and/or software is provided for permitting the one or more computing devices of the player tracking host 136 to send and receive information. In one embodiment, the player tracking host 136 includes at least one data storage element for storing the player information. The data storage element may comprise a hard drive, RAM, tape drive, CD-ROM, DVD-RAM or other memory or data storage member or element. The player tracking host 136 may including a number of other devices, such as one or more displays, keyboards and other devices for displaying data, controlling operation thereof and the like.

In one embodiment, the player tracking host 136 and the financial transaction host 120 may comprise the same apparatus or group of apparatus. In the embodiment illustrated, the player tracking host 136 and financial tracking host 120 are separate, but in communication with one another. In one embodiment, some but not all of the components of the hosts may be shared, such as a memory or data storage device or devices.

In one embodiment, the player tracking host 136 is adapted to implement a player tracking/reward or "comp" function.

The player tracking host 136 may thus be adapted to aggregate game play data regarding various players playing the gaming machines 102. This data may include information such as the length of time of game play, amounts bet, amounts awarded, and a wide variety of other information. In general, the player tracking device of each gaming machine 102 is adapted to transmit the player tracking data over the communications link(s) to the player tracking host 136. Based on player activities, a player may be awarded a "comp". Comps are generally awards, such as prizes, money, free game play, lodging or the like which are provided to the player apart from any awards which the player receives from direct game play. Such are referred to as "comps" as they are "complimentary" and generally do not require specific obligation, such as an additional bet, in order to be received. The system is often referred to as a reward or loyalty system because a player is generally awarded an award resulting from extended or frequent game play. In one arrangement, a player may acquire points based upon a game criteria, such as amounts bet, won or lost. If a player accrues sufficient credits, the player is awarded a reward.

Preferably, one or more data files are stored at the memory (or other data storage device/element) which is located at or in association with the financial transaction host 120. In one embodiment, the data file corresponds to a player. The data file is accessible or identifiable by identification information, such as an account number or player identifier.

As described herein, this identifier may be stored on a player card. As detailed above, in one embodiment a password, player PIN or the like may be required to access an account or file in addition to the player identifier. In one embodiment, the player PIN is stored at the data file and is used to confirm the PIN entered by the player.

In one embodiment, a player may have more than one account. Each account may be represented by one or more different data files. In another embodiment, the information regarding all accounts may be stored in a single data file. Different identifiers or different PINs may be used to identify and access each account.

Where a single host or server is provided for both financial and reward/tracking functions, the data files or accounts may include both information regarding a player's finances and game play information, such as rewarded points. Where separate servers or hosts are provided, separate or different accounts or files may be provided.

In one embodiment, the system includes data files containing information regarding credits or monies which the player may use to play a game or obtain other goods or services. In one embodiment, the credits or monies may have been deposited by the player. The credits or monies may also be awarded or rewarded, or purchased, as described below.

Means are provided for deducting credits or monies which are used by a player. This means may comprise software, such as computer program code. In one embodiment, a signal is transmitted from a gaming machine to the financial transaction host 120 in response to input from a player to place a bet (such as by pressing a bet button at the game). If the player has credits associated with their account, a signal is transmitted back to the gaming machine 102 approving the bet, and the monies or credits are deducted from the player's account. The deducted monies may be tracked for accounting purposes, such as by crediting the debited amount to a casino account or holding account.

Means are also provided for crediting monies or credits which are won by a player. This means may again comprise software. When a gaming machine indicates a win, the amount won may be credited to a player's account.

In one or more embodiments, means may be provided for assigning account criteria and determining if account criteria are met. As noted above, such criteria may comprise a limit on the amount of funds which may be debited from an account during a period of time, that no winnings are to be credited to the account, that a portion of funds credited are to be donated to a charity, that tax withholding is to be removed from all winnings, or a wide variety of other criteria.

In a preferred configuration of a system of the invention, each player is provided with a single access media, such as a player card. By using this single card at a gaming machine, both financial transaction and player tracking/reward functions are enabled. If a player has more than one account, such as a debit financial account for playing games and a credit account to which winnings are paid, then when playing the game the system is adapted to use the player's main or debit account. A player may still access and manage all of their accounts, such as remotely from a computer, at a kiosk or customer service location. In one embodiment, a player may need to utilize a different identifier to access other accounts. For example, such accounts may be provided with other account numbers, or the players PIN number may differ for accounts all having the same main account number.

In one embodiment, the system is arranged to permit a player to access all of their accounts once their single identifier (such as account number) and PIN (if necessary) are provided. For example, the system may generate and send information to the player for display on a display screen. This information may include information regarding all of the player's accounts. A player may then select a particular account to manage, such as for causing the system to display detailed information regarding that account.

It will be appreciated that a system for implementing one or more methods of the invention, including specifically in a gaming environment, may vary from that described and illustrated. In one embodiment, the system may be adapted to include table and other types of gaming devices.

One or more methods of the invention specifically relating to the casino or gaming environment will now be described. Referring to FIG. 1, in one embodiment, a casino patron or player may establish an account with a casino. As noted above, there are a variety of ways for a player to establish an account, including registering on-line (such as over the Internet) or at the casino or a kiosk.

With respect to the casino or gaming environment, a wide variety of accounts may be established. These accounts may have a wide range of criteria associated therewith. For example, a player may set up a player account in similar fashion to a general customer account. This account may be arranged to permit both withdrawals and deposits, and may or may not have a limit associated therewith.

One particular account which may be permitted is a limit account, which permits only a predetermined amount of withdrawals over a period of time. For example, the account may permit a player to withdraw only $500 per month. A player may wish to establish such an account to limit their total expenditures over time.

Another account may have a deposit limit. The deposit limit works in a similar fashion to a limit account, except that the maximum amount which may be withdrawn is limited by the maximum amount which may be deposited. For example, the account may have a limit of $100, permitting a player to only deposit $100. In one embodiment, the limit may be for a predetermined period of time, such as a maximum of $100 per month, with the total amount which may be associated with the account increasing over time. An account with a deposit limit may have a deposit limit only for the player. If a player wins a large jackpot, for example, the casino may credit the jackpot to the account even though the jackpot exceeds the deposit limit.

In one embodiment, the account may be provided with special features which are associated with linked accounts. For example, a player may be permitted to designate a particular portion of their winnings to a charity account, account for treatment of gambling addiction or the like. The account may have criteria for transferring 1% of all winnings deposited into the account to such other accounts. Other amounts may be transferred, and the time of the transfer may vary, such as at periodic times or at the time the winning is credited.

In one or more embodiments, a player's financial account may also comprise a player tracking account. In this arrangement, the account may be associated with one or more files both delineating the financial aspects of the account, but also information typically contained in a player's player tracking file. The player tracking information may include player identification information, generally common to the financial data. The player tracking information may also include information such as the length of time a player has played a game, the amounts won and/or lost, information regarding past game play, calculated theoretical win and loss information, and other information as is known in the art. Alternatively, a player's tracking and financial accounts may be linked.

As noted above, in a preferred arrangement, a player is issued a single access media which is associated with both the financial account and player account (whether such accounts are separate or merged). In this arrangement, activities associated with player tracking and financial accounting may occur simultaneously from the player's perspective. Referring to FIGS. 2 and 3, a player may travel to a gaming machine 102 and insert their player card into the card reader 116. In response to the card insertion, the player tracking device at the gaming machine 102 may be caused to request input of a player's identification or PIN number. This requested may be displayed on a video display at the gaming machine.

The player may input their PIN via the keypad 118 at the gaming machine 102. The player's account identifier (such as account number) reader from the card and the player's inputted PIN are then transmitted from the gaming machine 102 to the financial transaction host 120 and/or player tracking host 136. The financial transaction host 120 and/or player tracking host 136 may then verify the identity of the player and entitlement to use the card (such as by verifying the inputted PIN against the player PIN stored in a file associated with their account).

A player may then engage in the play of a game. In a game requiring a bet or wager, the player may first attempt to place a bet, such as by pressing a "bet" button at the gaming machine 102. In response to a request to place a bet, the gaming machine 102 may send a signal to the financial transaction host 102 for verification that the player has sufficient funds (i.e. credits or monies) associated with their account to place the bet. If so, then the bet amount may be credited to the gaming machine, and the bet amount may be debited from the player's financial account.

If the accounts does not include sufficient funds, the player may be notified, such as by a visibly displayed or audio notification. The player may then provide an alternate method of payment, such as insertion of coins or bills. The player may also travel to a cashier cage and deposit finds into their account.

In one embodiment, a player may be permitted to deposit funds into their financial account at the gaming machine 102. A player may insert coins or bills, and have the deposited amounts credited directly to their account.

In one embodiment, the financial transaction host 120 may transmit credit information to a gaming machine 102 regarding the total credits in the account belonging to or useable by the player. The number of credits may be adjusted based upon the denomination of bets which the gaming machine accepts. For example, if a player has $100 in their account and begins playing a 25 cent minimum bet slot machine, then the machine may indicate that the player has 400 credits.

Advantageously, while the player plays the game, the player tracking host 136 may track the player's play. For example, the gaming machine 102 may transmit game play information such as length of play time to the player tracking host 136.

In the event the player is awarded winnings while playing a game, then those winnings may be paid directly to the player in a manner commonly known, or may be credited to the player's account. For example, if a player wins 400 credits while playing a 25 cent machine, the player's account may be credited $100. As noted, the manner by which winnings are credited may depend upon criteria associated with the account. If the player has a charity function, 1% or $1 of this winning may be credited to the appropriate charity account and the remainder to the player's financial account. If the player wishes, the winnings may be deposited in a separate winnings account belonging to the player. Such an account maybe arranged to prevent withdraws at a gaming machine. In this manner, a player may play until the funds in their main account are exhausted, and then the player may obtain their winnings from play of the main account moneys.

In a preferred embodiment of the invention, a player may access their account and engage in a wide variety of activities in similar manner to that illustrated in FIG. 1(*d*). For example, a player may be permitted to access their account from a remote location. Referring to FIG. 2, a player may be permitted to access their account via the Internet. The financial transaction host 120 may be configured to generate a graphical user interface which is displayed to the player and via which the player may provide input.

The player may be provided with a variety of options. In one or more embodiments, a player may be entitled to make changes to their account, such as change their PIN, address or the like. A player may also be able to deposit finds. In one embodiment, a player may provide bank account or credit card account information which is then used by the financial transaction host 120 to effect an electronic funds transfer to their account via a separate financial communications link.

A player may be able to change characteristics of their account, such as limits on withdrawals. In some instances, changes may only be made by or with the permission of the account provider.

A player may be permitted to move funds between accounts. For example, a player may be permitted to withdraw funds from one of their accounts and move the funds to another of their accounts or to the account of another party.

In a preferred embodiment, a player is permitted to view information regarding their player tracking account in a similar manner or at the same time as they obtain their financial account information. As is known, it is common to award points to game players based upon their game play. These points may be redeemed for prizes, such as free game play, food, tickets to shows and other goods and services.

In one embodiment, a player may be provided with both their monetary account balance and their point total. In some instances, a player may be permitted to "buy" player reward points, or cash in player points. In the first arrangement, a player may desire to obtain a player reward but may be a few points short of the level of points necessary. The player may be permitted to transfer money from their financial account to the casino to buy the additional points necessary. In the second arrangement, the casino may offer a "cash-back" on points. A player may turn in their points at a predetermined rate for money which is deposited in their financial account.

In one or more embodiments, a player may be permitted to use deposited funds at the casino, and may not be permitted to withdraw funds. This account arrangement is particular suited to that where a casino offers cash-back on play or points, as the casino is then assured that the player will bet those monies again at a later date. This account configuration also is particularly suited to the casino offering a bonus. For example, a casino may deposit an amount equal to a predetermined amount of a player's deposit in addition to the player's deposit. For example, a casino may indicate that the size of a player's deposit is 105% of the player's actual deposit.

One or more embodiments of the invention maybe used to facilitate remote play of a game or games by a player. In one embodiment, game information may be transmitted to a player at a remote location, thus enabling a player to play the game at the remote location. For example, referring to FIG. 5, the system 100 may include a game server 138 which generates game play information and receives or accepts game play input from a remote player. The game server is preferably in communication with the gateway 122 or other communication interface so that game play information may be transmitted to a player over a dedicated line or the Internet. A player's input may be transmitted from the player's location to the game server 138. The player's location may comprise a remote dedicated station, a desktop or laptop computer or the like.

Advantageously, a player's remote play in this fashion may be tracked by the player tracking network, with game play information transmitted from the game server 138 to the player tracking server 136. In addition, a player may use their financial account to both fund their betting activities and receive winnings.

In like manner to the play of a gaming machine 102, a remote player may input their account information, such as by swiping their card through a card reader associated with the remote station, such as the player's computer. The player may also manually input the account information. Also in like manner to play of a gaming machine 102, the identification information may be used to validate the player's right to play a game, to place bets, to track game play and the like. For example, the player identification information may be used by the financial transaction server 120 to verify that the player has funds for placing a wager or bet. Such verification may be received from the game server 138 in response to input of bet or wager information from a player.

In general, the various methods of the invention described may be applied to this remote gaming environment, with the player having winnings credited to their account and the other activities described herein.

A particular advantage of this arrangement as applied to remote gaming is security. When a player uses their player account to fund their wagering activity, the casino can be sure that the player is entitled to place bets, since the casino has direct access to and control over the player's account. In addition, the player is protected, since the player is using an account associated with the gaming entity. The player is not required to enter credit card or bank information which may be intercepted by others and then used for a variety of purposes.

Of course, the game server 138 or other apparatus maybe configured to generate graphical user interface information which is transmitted to a remote player. The player may utilize this interface to interact with the system 100, such as be inputting identification information when required and engaging in other account and game play transactions.

In one embodiment of the invention, the various servers, such as the game server 138, financial sever 120 and player tracking server 136 are all part of the same network, such as a LAN of a casino. In another embodiment, it will be appreciated that the various servers or other apparatus may be associated with different networks. For example, several casinos may utilize a system such as described, but where only a single financial server and/or player tracking server are provided at one location. Gaming machines may be associated with a number of different networks at different properties, but communication with the single financial and/or player tracking server.

In one embodiment, a casino may offer cards which are associated with "pre-paid" accounts in similar fashion to that described above for use generally in purchasing goods and services. For example, a casino may sell cards at grocery stores and other locations. The price of the card may be discounted in relation to the actual value of the account. For example, a player may pay $20 for a card which is associated with an account having $25 worth of credits therein. These cards may be used by any party, and may be transferable, making them useful as gifts.

A number of other configurations of methods and apparatus are contemplated. One or more additional aspects of player tracking and financial accounting may be implemented using the apparatus and systems described herein.

In accordance with the invention, a player has control over their financial account. In one embodiment, so does the casino. The casino may access the player's account for a variety of purposes, such as limiting the total amount a player may withdraw from their account. For example, a casino may monitor player accounts and apply criteria to determine if a player is losing large sums or is engaging in uncommon account activity. If the player is suffering large losses, a casino may freeze the player's account or limit the total amount the player may withdraw. This aspect of the invention may be used to protect the player. The casino may also become aware of unusual account activity and freeze the account or conduct and investigation. Such an investigation may result in a finding that the player's card has been stolen and is being used by another party.

In one embodiment, a casino may deduct taxes due from a winning directly from the player's account. Upon a win, the casino may determine the tax liability and transfer the withholding to a withholding account or directly transfer it to an IRS deposit account.

A casino may offer accounts with a variety of casino determined criteria. For example, a casino may offer accounts which have an expiration date. In the case of prepaid cards, the accounts associated with the cards may become unusable after a predetermine date or a predetermined time after purchase. In this manner, the length of time that the casino is exposed to play of the moneys is not unlimited. Amounts which are deposited into a player's account may also expire. For example, if a player redeems points for financial awards, the financial awards may have an associated expiration date by which the funds must be bet or bet lost.

A casino may enable usage of a financial account via on-line game play and table or other games besides electronic and electromechanical gaming machines. For example, a blackjack table may be fitted with card readers and keypads, and all chips bet and won may be accounted for via the system 100, such as by reading a bar code provided on the chips. A player may use their card to obtain $100 in chips at a table, and winnings may be credited by the dealer to the player's account.

Access media may be provided other than magnetic stripe cards. In addition, a casino may not require that a PIN or other identifier be inputted in order to access the account.

A casino may permit a player to access their account information in a wide variety of manners. As illustrated in FIG. 2, a casino may provide kiosks 132 at which a player may access their account and obtain account information or manage their account. A player may also obtain account information and manage their account at a cashier station 126 or other customer service location.

In one embodiment, a player may utilized their casino card at an automated teller machine (ATM) in similar manner to a bank card. The player may withdraw funds from the account in the form of cash dispensed at the ATM.

A casino may enable a player to access their account from a room. An interface, such as integrated with a television, may be provided which permits a player to view account information and manage their account.

The present invention in more general application has numerous benefits and advantages. In one embodiment, an account of the present invention is configured to permit minors to make financial transactions. In accordance with the invention, a debit account is established by or for the minor. Because of the existence of the funds in the account, a minor may complete a transaction without concern to the account provider/financial institution that the minor will pay for goods.

In one or more embodiments, this arrangement permits a customer to "buy" an account for use by another person in a fixed amount. In this manner, the account may be used as a gift. This arrangement has the advantage that the recipient of the account can utilize the funds associated with the account to make a purchase or pay for goods/services from essentially any location. The recipient may purchase goods on-line or at a store. The recipient is not limited to a particular store or mall.

The customer may also utilize one or more of the accounts in similar fashion to travelers checks. Because the funds associated with the accounts are different, a loss such as by theft of a single access media does not affect the remaining finds. For added security, each access media may have a different access code.

Parents and others may arrange an account for their children. The children are not permitted to spend more money than their parents provide, because of the arrangement of the account. On the other hand, the parents can provide their children with a convenient means for paying for items even though they may be located a great distance apart. The parents may also access the account to track purchases and other transactions by their children. The parents may also arrange the account as an "allowance" account, where funds are placed into their children's account at predetermined intervals without specific action by the parents or children at the time of each deposit.

The methods and accounts of the present invention has several safety features. In one embodiment, an account expires after a predetermined time. In this arrangement, the risk that a thief may find and be able to use a lost access card is reduced. The account is associated with a unique account signature which is generated from data which is difficult to obtain.

The methods and accounts permit a wide range of transactions, including a number of very specific transactions which are not presently facilitated. For example, a vendor may establish promotional accounts for current and potential customers. One advantage of a promotional account is that a large company may establish accounts which customers can use at one or more of their stores located in different areas. For example, a retailer having outlet in Los Angeles and New York may issue cards associated with accounts for use by customer at either location. This arrangement is also advantageous for franchisees: the franchiser may sponsor a promotion for their franchisees whereby the discount or amounts provided to the customers are paid for by the franchiser.

A promotional account may also be a prize or award. A vendor may award an account to one or more customer who win a contest or drawing or the like. A vendor may also arrange the promotional account with an expiration date requiring the customer to utilize the account within a predetermined time.

A customer may establish a charity account for themselves, or a charity may establish an account for a customer. For example, a charity may seek donations from customers in the form of deposits into a charity account established by the charity for the customer.

In one or more embodiments, a customer or other user of a promotional account may be prevented from any account activities except use of the account to facilitate a purchase. The customer or user to whom the account is issued may be prevented from obtaining funds from the account (such as cash) or viewing data associated with the account such as the remaining balance or the like. A customer may also be prevented from merging the account or adding funds to the account. On the other hand, a vendor may be permitted to track all purchases and other uses of promotional accounts. In this manner, the vendor can obtain important data regarding the customer, including their spending habits, spending locations and similar information.

A business may use the account for business to business transactions. For example, a business may set up a master account and a number of sub or allowance accounts. The business may use the accounts to pay suppliers of goods and services. The master account may comprise a main account for the business and each allowance account an account relating to a particular vendor or project. Commensurate with billing or an accounting period, the business may have arranged an automatic transfer of funds from the master account to one or more of the allowance accounts, and from one or more of the allowance accounts to each particular supplier for their bill.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A system, comprising:
    a player identification input device configured to receive player identification data from an account access medium having player identification information stored thereon;
    a plurality of gaming terminals, each gaming terminal comprising:
        at least one input mechanism for receiving cash or an indicia of credit for a wager to play a wager based game; and
        at least one output mechanism for outputting cash or an indicia of credit; and
    a financial server configured to communicate with the plurality of gaming terminals via a communication network, the financial server having associated memory for storing data files corresponding to players' personal accounts and identifiable with player identification data from said player identification input device, the data files including information regarding finances available for use by players for wagering games, the financial server further configured to communicate with a bank or other financial institution;
    wherein the system is configured to permit a player, via at least one of the gaming terminals, to access at least one data file associated with the player and stored on the financial server using the player identification data, and to open a new player personal account, merge existing player personal accounts into a single player personal account, change an account type of an existing player personal account, and close out an existing player personal account.

2. The system of claim 1, wherein the access medium comprises a card having a magnetic stripe.

3. The system of claim 1, wherein the financial server is further configured to credit finances to a player's data file in response to an indication that funds have been provided by the player.

4. The system of claim 1, wherein the financial server is further configured to associate criteria regarding use of the finances indicated available in the player's file.

5. A financial transaction system, comprising:
    at least one server configured to do the following:
        generate a financial account corresponding to a player, the financial account represented by at least one data file containing information regarding available finances for playing one or more gaming devices;
        authorize the issuance of an account access medium to the player, the account access medium having identification information stored thereon;
        receive the identification information from a player identification input device of a gaming terminal currently used by the player, the gaming terminal comprising: a player identification input device, one or more input mechanisms for receiving cash or an indicia of credit for a wager to play a wager based game and one or more output mechanisms for outputting cash or an indicia of credit, the player identification input device configured to receive player identification data from an account access medium having player identification information stored thereon;
        communicate with a bank or other financial institution
        permit the player, via the gaming terminal currently used by the player, to access at least one data file associated with the player and stored on the financial server using the player identification data, and open a new player personal account, merge existing player personal accounts into a single account, change an account type of an existing player personal account, and close out an existing player personal account.

6. The financial transaction system of claim 5, wherein the at least one data file includes personal identification code information, wherein the at least one server is configured to verify a personal identification code received from the gaming terminal currently used by the player with the personal identification code information stored in the at least one data file.

7. The financial transaction system of claim 5, wherein the at least one server is configured to modify the at least one data file based upon amounts bet and amounts won by the player while playing the gaming device.

8. The financial transaction system of claim 5, wherein the available finance information comprises a credit amount.

9. The financial transaction system of claim 8, wherein the at least one server is configured to modify the available finance data by increasing the credit amount if the player is a winner of a game played at the gaming device currently used by the player.

10. The financial transaction system of claim 5, wherein the at least one server is configured to assign criteria regarding the use of finances represented by the financial information.

11. The financial transaction system of claim 5, wherein the game play information includes a number of points rewarded to the player and wherein the at least one server is configured to convert one or more of the points to a credit amount and to modify the financial information to reflect the credit amount.

12. The financial transaction system of claim 5, wherein one or more servers are configured to receive player input and to allow access to at least one data file according to the player input.

13. The financial transaction system of claim 5, wherein the at least one server is configured to associate credits represented by the financial information with a second financial account of input from the player.

14. The financial transaction system of claim 5, wherein the at least one server is configured to generate financial information regarding a credit paid by the player and to store the financial information.

15. The financial transaction system of claim 14, wherein the at least one server is configured to receive financial data from the bank or other financial institution and wherein the credit corresponds to at least some of the financial data received from the bank or other financial institution.

16. A gaming machine comprising:
at least one input mechanism for receiving cash or an indicia of credit for a wager to play a wager based game
at least one output mechanism for outputting cash or an indicia of credit; and
a player identification input device configured to receive player identification data from an account access medium having player identification information stored thereon; wherein:
the gaming machine is configured to be communicatively coupled to a financial server, the financial server having associated memory for storing at least one data file corresponding to players' personal accounts and identifiable with player identification data from said player identification input device, the at least one data file including information regarding finances available for use by players for wagering games, the financial server further configured to communicate with a bank or other financial institution; and
the gaming machine is configured to permit a player to access at least one data file associated with the player and stored on the financial server using the player identification data, and to open a new player personal account, merge existing player personal accounts into a single account, change an account type of an existing player personal account, and close out an existing player personal account.

17. The gaming machine of claim 16, wherein the at least one data file includes personal identification code information, and the financial server is configured to verify a personal identification code received from the gaming machine with the personal identification code information stored in the at least one data file.

18. The gaming machine of claim 16 wherein the financial server is configured to modify the at least one data file based upon amounts bet and amounts won by the player while playing the gaming machine.

* * * * *